United States Patent
Chavda et al.

(10) Patent No.: US 10,686,901 B2
(45) Date of Patent: *Jun. 16, 2020

(54) USER PRESENCE AGGREGATION AT A SERVER

(71) Applicant: Microsoft Technology Licensing, LLC, Redmond, WA (US)

(72) Inventors: Ankur Chavda, Seattle, WA (US); Amritansh Raghav, Seattle, WA (US); Eran Shtiegman, Redmond, WA (US); Setty Venkateshaiah, Bellevue, WA (US); Sira Rao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/945,916

(22) Filed: Apr. 5, 2018

(65) Prior Publication Data

US 2018/0227378 A1    Aug. 9, 2018

Related U.S. Application Data

(63) Continuation of application No. 14/967,105, filed on Dec. 11, 2015, now Pat. No. 9,942,338, which is a continuation of application No. 11/419,947, filed on May 23, 2006, now Pat. No. 9,241,038.

(51) Int. Cl.
*H04L 29/08* (2006.01)
*H04L 12/58* (2006.01)
*G06Q 10/10* (2012.01)

(52) U.S. Cl.
CPC .......... *H04L 67/24* (2013.01); *H04L 51/043* (2013.01); *G06Q 10/10* (2013.01); *H04L 29/08684* (2013.01); *H04L 67/22* (2013.01)

(58) Field of Classification Search
CPC ..... H04L 67/24; H04L 67/22; H04M 3/42365
See application file for complete search history.

(56) References Cited

U.S. PATENT DOCUMENTS

| | | | |
|---|---|---|---|
| 6,148,328 A * | 11/2000 | Cuomo | H04L 12/1822 370/260 |
| 7,263,545 B2 * | 8/2007 | Digate | G06Q 10/10 709/206 |
| 7,359,938 B1 * | 4/2008 | Davies | H04M 3/42008 709/204 |

(Continued)

*Primary Examiner* — Tom Y Chang
(74) *Attorney, Agent, or Firm* — Schwegman Lundberg & Woessner, P.A.

(57) ABSTRACT

A presence aggregation system provides a presence aggregation server that allows for the publication of presence state of a publisher from the publisher's multiple endpoints. A presence state includes an availability value and an activity. An activity may include an activity token and/or a custom string. When any one of the publisher's endpoints makes a presence state publication on the presence aggregation server, the presence aggregation server generates an aggregated state of the publisher (i.e., the availability of the publisher aggregated across all of the publisher's endpoints) and publishes the generated aggregated state to each of the publisher's endpoints. The presence aggregation server may also provide the publisher's aggregated state to the subscribers of the publisher's aggregated state information.

20 Claims, 6 Drawing Sheets

(56) References Cited

U.S. PATENT DOCUMENTS

| | | | |
|---|---|---|---|
| 7,433,922 B2* | 10/2008 | Engstrom | G06Q 30/02 709/205 |
| 2002/0116461 A1* | 8/2002 | Diacakis | G06Q 10/087 709/204 |
| 2003/0009530 A1* | 1/2003 | Philonenko | H04L 41/18 709/206 |
| 2003/0073440 A1* | 4/2003 | Mukherjee | H04L 29/06 455/435.1 |
| 2003/0217096 A1* | 11/2003 | McKelvie | H04L 51/04 709/202 |
| 2003/0217098 A1* | 11/2003 | Bobde | H04L 29/06 709/202 |
| 2003/0217099 A1* | 11/2003 | Bobde | H04L 29/06 709/202 |
| 2003/0217142 A1* | 11/2003 | Bobde | G06Q 10/107 709/224 |
| 2004/0003037 A1* | 1/2004 | Fujimoto | G06Q 10/107 709/203 |
| 2004/0010573 A1* | 1/2004 | Debaty | H04L 67/24 709/221 |
| 2004/0122901 A1* | 6/2004 | Sylvain | H04L 29/06 709/206 |
| 2004/0128391 A1* | 7/2004 | Patzer | H04L 12/66 709/228 |
| 2004/0148347 A1* | 7/2004 | Appelman | H04L 29/08684 709/204 |
| 2004/0161090 A1* | 8/2004 | Digate | H04L 29/06 379/202.01 |
| 2004/0162881 A1* | 8/2004 | Digate | G06Q 10/10 709/206 |
| 2004/0172481 A1* | 9/2004 | Engstrom | G06Q 30/02 709/239 |
| 2004/0205134 A1* | 10/2004 | Digate | G06Q 10/10 709/206 |
| 2005/0068167 A1* | 3/2005 | Boyer | H04L 51/04 340/531 |
| 2005/0071435 A1* | 3/2005 | Karstens | H04L 29/06 709/207 |
| 2005/0232184 A1* | 10/2005 | Borella | H04W 64/00 370/328 |
| 2005/0232187 A1* | 10/2005 | Haller | H04M 1/7253 370/328 |
| 2005/0262195 A1* | 11/2005 | Ono | H04L 29/06 709/203 |
| 2006/0031293 A1* | 2/2006 | Thommes | G06Q 10/06 709/204 |
| 2006/0069686 A1* | 3/2006 | Beyda | G06Q 10/109 |
| 2006/0099911 A1* | 5/2006 | Shibuya | H04W 60/00 455/41.2 |
| 2006/0117050 A1* | 6/2006 | John | H04M 3/42365 |
| 2006/0133586 A1* | 6/2006 | Kasai | G06F 16/40 379/88.12 |
| 2006/0165058 A1* | 7/2006 | Caballero-McCann | H04L 29/06027 370/352 |
| 2006/0190600 A1* | 8/2006 | Blohm | G06Q 10/06 709/225 |
| 2006/0288099 A1* | 12/2006 | Jefferson | H04L 29/06027 709/224 |
| 2007/0027702 A1* | 2/2007 | Cox | G06Q 10/00 705/26.1 |
| 2007/0027920 A1* | 2/2007 | Alvarado | G06Q 10/109 |
| 2007/0067443 A1* | 3/2007 | Seligmann | H04L 67/104 709/224 |
| 2007/0088818 A1* | 4/2007 | Roberts | H04L 63/102 709/224 |
| 2007/0124158 A1* | 5/2007 | Kakuta | G06Q 10/0637 709/204 |
| 2007/0130323 A1* | 6/2007 | Landsman | H04L 67/24 709/224 |
| 2007/0182546 A1* | 8/2007 | Virk | H04L 67/24 340/539.13 |
| 2007/0198725 A1* | 8/2007 | Morris | G06Q 10/10 709/227 |
| 2007/0233852 A1* | 10/2007 | Jachner | G06Q 10/109 709/224 |
| 2007/0233875 A1* | 10/2007 | Raghav | G06Q 10/107 709/227 |
| 2007/0239866 A1* | 10/2007 | Cox | H04L 67/24 709/224 |
| 2007/0239869 A1* | 10/2007 | Raghav | G06Q 10/10 709/224 |
| 2007/0266076 A1* | 11/2007 | Cox | H04L 51/046 709/203 |
| 2008/0316939 A1* | 12/2008 | Shimamura | H04M 3/42374 370/254 |

\* cited by examiner

USER PRESENCE AGGREGATION AT A SERVER

CROSS-REFERENCE TO RELATED APPLICATIONS

This application is a continuation application of U.S. patent application Ser. No. 14/967,105, filed on Dec. 11, 2015, and entitled "USER PRESENCE AGGREGATION AT A SERVER," which is a continuation application of U.S. patent application Ser. No. 11/419,947, filed on May 23, 2006, issued as U.S. Pat. No. 9,241,038, and entitled "USER PRESENCE AGGREGATION AT A SERVER," both of which are incorporated herein in their entirety by reference.

This application is related to U.S. patent application Ser. No. 11/392,472, entitled "Aggregating User Presence Across Multiple Endpoints," which was filed on Mar. 28, 2006, issued as U.S. Pat. No. 7,945,612, and U.S. patent application Ser. No. 11/392,991, entitled "User Interface For User Presence Aggregated Across Multiple Endpoints," which was filed on Mar. 28, 2006, the disclosures of which are incorporated by reference herein in their entireties.

BACKGROUND

Users of computing devices (e.g., laptops, cellular phones, and personal digital assistants) often need to communicate in real time. A common form of real-time communications is provided by instant messaging services. An instant messaging service allows participants at endpoints to send messages and have them received within a second or two by the other participants in a conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

When an initiating participant wants to start a real-time conversation, that participant needs to know whether the intended participants are available to respond in real time to a message. If not, then communications via conventional electronic mail, voice mail, or some other mechanism may be more appropriate. For example, if the computers of the intended participants are currently powered off, then a real-time conversation may not be possible. Moreover, if their computers are currently powered on, but the intended participants are away from their computers, a real-time conversation is also not possible. The initiating participant would like to know the availability of the intended participants so that an appropriate decision on the form of communication can be made.

Presence services provide this availability information. The availability status of an entity such as a computer system or a user associated with that computer system is referred to as "presence information." Presence information identifies the current "presence state" of the user. Users make their presence information available to a presence service so that other users can decide how best to communicate with them. For example, the presence information may indicate whether a user is logged on ("online") with an instant messaging server or is logged off ("offline"). Presence information may also provide more detailed information about the availability of the user. For example, even though a user is online, that user may be away from their computer in a meeting. In such a case, the presence state may indicate "online" and "in a meeting."

In an instant messaging context, a publishing user ("publisher") may provide their presence information to a presence server that then provides the presence information to subscribing users ("subscribers"). Thus, a presence server may use a subscriber/publisher model to provide the presence information for the users of the presence service. Whenever the presence information of a user changes, the presence server is notified of the change by that user's computer system and in turn notifies the subscribing users of the change. A subscribing user can then decide whether to initiate an instant messaging conversation based on the presence information of the intended participants. For example, if the presence information indicates that a publishing user is currently in a conference telephone call, then the subscribing user may decide to send an instant message, rather than place a telephone call, to the publishing user. If the subscribing user, however, needs to call and speak with the publishing user, the subscribing user needs to monitor the presence information of the publishing user to know when the call can be placed. When the subscribing user notices that the publishing user's presence information indicates that the telephone conference has been concluded, the subscribing user can then place the telephone call. RFC 2778 is a specification relating to presence information in instant messaging systems. RFC 3856 is a specification relating to presence information using the Session Initiation Protocol ("SIP").

It is not uncommon for a user to be signed into a collaboration server using many devices at the same time, thus creating multiple endpoints. For example, a user may simultaneously be signed into an instant messaging server using a personal digital assistant, a wireless telephone, and a laptop computer. In this instance, each of these endpoints contains pieces of information regarding the user, such as whether the user is typing on a device, using the device to make a phone call, etc., and the user's availability for communication or other forms of interaction with others at any instant in time. While current presence services may be suitable for providing a user's availability to communicate at a specific user endpoint, these presence services are unable to provide an accurate depiction of a user's availability to communicate when the user is signed into multiple endpoints.

SUMMARY

A method and system for aggregating user presence across multiple endpoints at a server is provided. A presence aggregation system provides a presence aggregation server that allows for the publication of presence states of a publisher from the publisher's multiple endpoints. A presence state includes an availability value and an activity. An activity may specify an activity taken and/or a custom string. For example, a user may publish a state that includes an availability value that indicates that the user (e.g., publisher) is online. When any one of the publisher's endpoints makes a presence state publication on the presence aggregation server, the presence aggregation server generates an aggregated state of the publisher (i.e., the availability of the publisher aggregated across all of the publisher's endpoints) and publishes the generated aggregated state to each of the publisher's endpoints. The presence aggregation server may also provide the publisher's aggregated state to the subscribers of the publisher's aggregated state information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
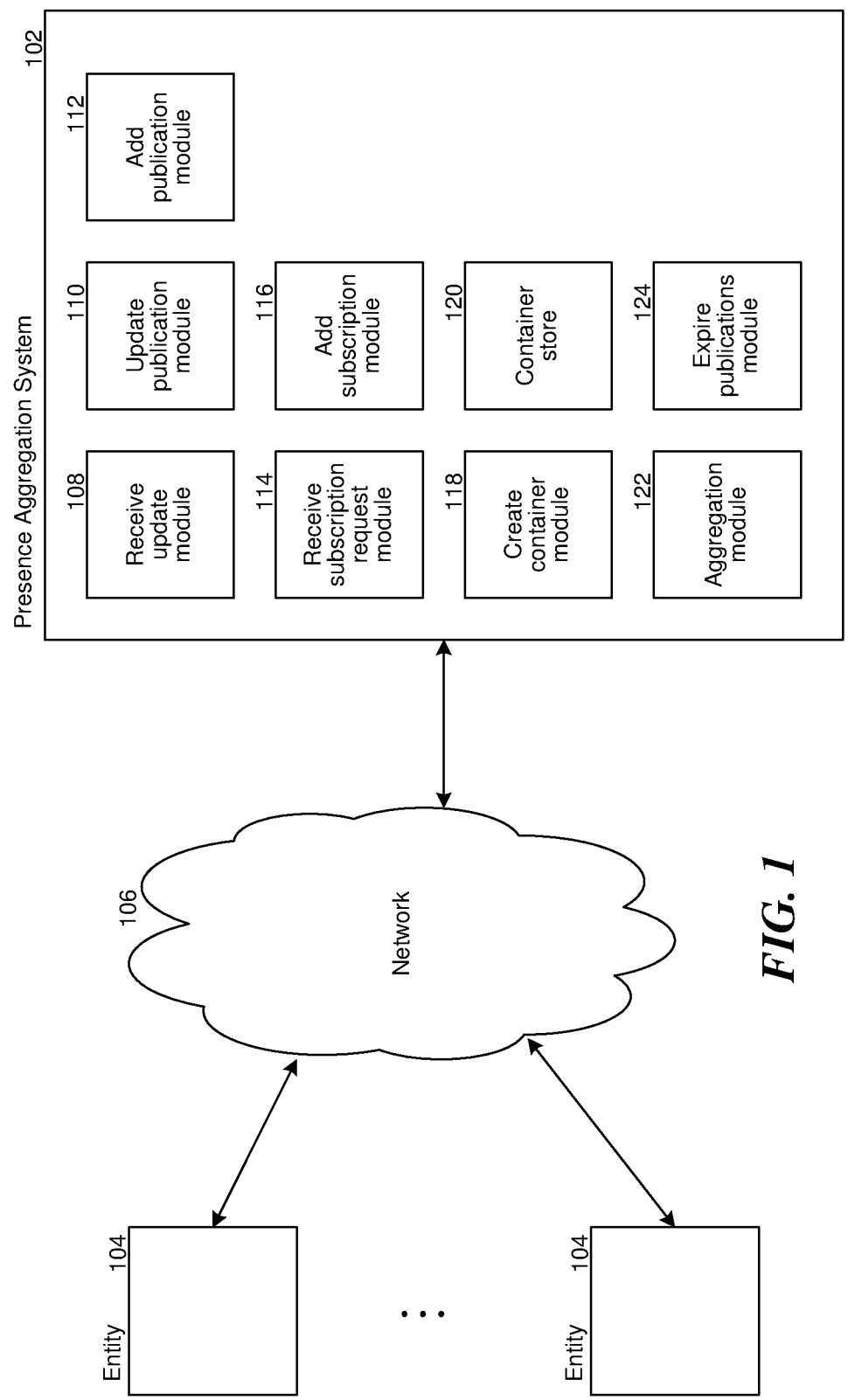
FIG. 1 is a block diagram that illustrates components of a presence aggregation system, according to some embodiments.

A method and system for aggregating user presence across multiple endpoints at a server is provided. In some embodiments, a presence aggregation system provides a presence aggregation server that allows for the publication of presence states of a publisher from any of the publisher's multiple endpoints. A presence state includes an availability value and an activity. An activity may specify an activity token and/or a custom string. For example, a user may publish a state that includes an availability value that indicates that the user (e.g., publisher) is online. As another example, a machine may specify that it is active by publishing a state that includes availability value that indicates that the machine is online. When any one of the publisher's endpoints publishes a presence state on the presence aggregation server, the presence aggregation server generates an aggregated presence state (also interchangeably referred to herein as an "aggregated state") of the publisher (i.e., the availability of the publisher aggregated across all of the publisher's endpoints) and publishes the generated aggregated state to each of the publisher's endpoints. The presence aggregation server may also provide the publisher's aggregated state to the subscribers of the publisher's aggregated state information. In some embodiments, the presence aggregation server may generate an aggregated state of a publisher when a presence state publication for the publisher expires. For example, a presence state publication may expire when an endpoint becomes offline. In some embodiments, the presence aggregation server may generate an aggregated state of a publisher based on specified triggers. For example, an endpoint may publish a presence state that indicates that the publisher is going to be busy at 2:00 P.M. In this instance, the presence aggregation server may generate an aggregated state for the publisher at the indicated time.

The presence state publication focuses on the publisher. By focusing on the publisher, the presence aggregation system provides a "person-centric" presence model in that the publisher is able to specify his or her presence for the desired modes of communication. The person-centric presence model simplifies the communication process by allowing a person to think in terms of "I want to talk to this person" instead of "I need to call the person's cell phone." For example, the publisher is able to indicate that communication by phone or an in-person meeting at the publisher's office is more convenient for the publisher than sending an instant message. A subscriber receiving the aggregated state of a publisher is able to use this information to make decisions on how to best communicate with the publisher. If the aggregated state of the publisher indicates that the publisher is currently away, the subscriber can send an instant message but will not be upset if a reply is not received. In this manner, the presence aggregation system allows a publisher to more accurately indicate their availability to communicate across all the publisher's endpoints, and the subscribers of the publisher's aggregated state to obtain a better indication of the availability and willingness of the publisher to communicate.

Throughout the description, the following terms will generally have the following meanings:

The term "activity" refers to a descriptor for what a user is doing at a moment in time. For example, a calendaring application can publish calendar type states that contain in-a-meeting event information.

The term "aggregated availability" refers to the availability associated with a user (e.g., publisher) across all of the user's endpoints.

The term "aggregated presence" refers to a combined presence of a user across all of the user's endpoints. Aggregated presence can include information beyond aggregated presence states. For example, aggregated presence can also include a machine's idle time, indication of location, etc.

The term "availability" refers to a user's willingness and ability to communicate. As such, a person's availability is a representation of how "available" the person is and/or whether the person can be interrupted. Availability is designated by a numerical value. The higher the number, the less reachable/available the person.

The term "callee" or "publisher" refers to a user that is the target of the presence-based communication (e.g., real-time communication). The callee or publisher is the person that publishes the presence information.

The term "caller" or "subscriber" refers to the user that is viewing the published aggregated availability information. The caller or subscriber is the user that initiates the presence-based communication to the publisher or callee.

The term "endpoint" refers to a single logon session of the user. Endpoints are typically synonymous with devices.

The term "presence" refers to information that is useful for determining a user's availability.

The term "state" refers to blocks of information that represent factors that influence a person's willingness and availability to communicate.

In some embodiments, the presence aggregation server provides containers for publishing presence information. The presence aggregation server provides each publisher a "status" container, and only the publisher has permissions to view the contents of his or her status container. Each status container contains a collection of zero, one or more presence state publications for its respective publisher. The presence aggregation server monitors the status containers for a change in the state of a publisher (e.g., a presence state publication that changes the publisher's state). Upon detecting a change in the publisher's state, the presence aggregation server generates an aggregated state (i.e., an aggregated availability and/or a current activity) of the publisher and publishes an indication of the aggregated state in the publisher's status container, thus notifying each of the publisher's endpoints of the published aggregated state. The presence aggregation server may also determine the publisher's computing device (also referred to herein as a "machine") that is the most active, and publish this information to the publisher's status container, thus notifying each of the publisher's endpoints of the publisher's most active machine. Each of the publisher's endpoints can then use this information to, by way of example, determine whether or not to "auto-accept" a request to communicate. The publisher's computing device is a device used by the publisher to create an endpoint.

The presence aggregation server allows each publisher to define a collection of one or more containers, to specify an access control list (ACL) for each container, and to specify the publications that are to be included in each container. The ACL specifies the entities, also referred to as "members," who are allowed to subscribe to receive the publications made to each container. For example, the publisher may specify members of a container by specifying membership types of individual entities (e.g., Joe Smith), a group of entities (e.g., Project A Marketing Team), entities with a common characteristic (e.g., within domain acme.com), and so on. The presence aggregation server allows entities to subscribe to receive a publisher's publications, including the subscriber's aggregated state and other published presence information. If the subscribing entity is a member of a container as determined by the container's ACL, then the presence aggregation server adds that entity as a subscriber of that container. The presence aggregation server then notifies the subscribers of the container of the publications made to that container. The publication may be the publisher's aggregated state as well as other presence information. For example, when the presence aggregation server generates an aggregated state of the publisher, the presence aggregation server can publish an indication of the aggregated state in each of the publisher's containers, thus notifying the subscribers of the publisher's aggregated state. The presence aggregation server may allow a publisher to publish presence information directly to the publisher's containers. For example, a publisher may define a container that is to be made available to subscribers who are coworkers and may define another container that is to be made available to all other subscribers. In this example, the publisher may want to publish more detailed presence information in the container that is available to coworkers. For example, in addition to the aggregated state, a publisher may also want to inform the coworkers that the publisher is "in a meeting with John," while not providing this additional piece of information to the others.

In some embodiments, a presence state publication may be of a type "user," "machine," "phone," "calendar," "conference," or "generic," as shown in Table 1 below.

TABLE 1

| State Type | Description |
| --- | --- |
| User | A preset state a publisher can manually set |
| Machine | A state of the endpoint machine (endpoint device) |
| Phone | The state of a publisher's phone |
| Calendar | Events in a publisher's schedule (e.g., Outlook schedule) |
| Conference | Triggered when a publisher is in a multiparty conversation or if the publisher is presenting in a collaborative session |
| Generic | All other states |

A user state is manually provided or specified by a publisher and, as such, provides an indication of the publisher's intent. For example, the presence aggregation system's client application executing on the publisher's machine, and which the publisher may have used to create an endpoint, may provide a user interface through which the publisher can access a list of user states, such as those listed in Table 2 below.

TABLE 2

| User State | Availability Value | Description |
| --- | --- | --- |
| Online | 3500 | Publisher is reachable |
| Busy | 6500 | Publisher is busy |
| Do Not Disturb | 9500 | Publisher should not be interrupted |
| Be Right Back | 12500 | Publisher is not currently reachable |
| Away | 15500 | Publisher is not at their desk |
| Appear Offline | 18500 | Publisher wants to be offline |

As shown by the example user states in Table 2, a publisher may indicate his or her intent to communicate as "Online," "Busy," "Do Not Disturb," "Be Right Back," "Away," and "Appear Offline." Each user state has a corresponding availability value that is a number that represents the availability of the subscriber as indicated by the user state from more available to less available, where the larger availability value corresponds to the less available state. For example, from amongst the six user states listed in Table 2, "Online" is the most available user state and "Appear Offline" is the least available user state. The publisher can specify a user state by selecting one of the user states from the displayed list. When a publisher selects one of the user states from the displayed list, the client application determines the availability value that corresponds to the specified user state, and publishes the availability value as the publisher's user state in the publisher's status container on the presence aggregation server. For example, if the publisher manually specifies a user state of "Online," the specified user state will be published in the publisher's status container as a user state availability value of 3500 (e.g., user state; avail=3500). When a user state is published, the presence aggregation server stamps the publication with a publication time.

A machine state provides an indication of whether the publisher is reachable on the machine. In some embodiments, each endpoint publishes a machine state. For example, the client application may monitor the publisher's machine for events such as keyboard activity or inactivity, mouse or pointing device activity or inactivity, activation of screen saver or machine lock, and other events that provide an indication of the use of the machine. When such an event is detected, the client application determines the availability value that corresponds to the machine state, and publishes the availability value as the publisher's machine state in the publisher's status container on the presence aggregation server. A list of example machine states and corresponding availability values and optional activity tokens is provided in Table 3 below.

TABLE 3

| Machine State | Availability Value | Activity Token | Description |
| --- | --- | --- | --- |
| Active | 3500 | NULL | Publisher is actively using the device and is reachable |

TABLE 3-continued

| Machine State | Availability Value | Activity Token | Description |
|---|---|---|---|
| Inactive | 3750 | Inactive | Publisher has not used the device but is still likely to be reachable |
| Unknown | 3750 | Inactive | The device cannot determine if the publisher is reachable |
| Away | 15500 | NULL | Publisher is probably not at the device and is not reachable |
| Off | 18500 | NULL | Publisher is not logged on and definitely not reachable |

As shown in Table 3, an endpoint may indicate the machine state as "Active," "Inactive," "Unknown," "Away," and "Off." Similar to the user states listed in Table 2, the machine states listed in Table 3 are ranked according to their indication of availability from more available to less available, where the larger availability value corresponds to the less available state. Moreover, from Tables 2 and 3, it can be seen that the machine state of "Away" indicates a less available state that a user state of "Do Not Disturb." The activity token, when present, is a text string that represents the particular machine state. The activity token is typically provided by the publisher (e.g., the client application that published the machine state). For example, the client application can determine that it is being currently used and, from this, determine a machine state of "Active." In this example, the client application can publish a machine state in the publisher's status container on the presence aggregation server as a machine state availability value of 3500 (e.g., machine state; avail=3500; activity token=NULL). In another example, the client application can monitor hardware activity to determine a machine state. When a machine state is published, the presence aggregation server stamps the publication with a publication time.

A phone state indicates the state of a publisher's phone. For example, the client application may detect that the publisher is currently engaged in a voice over Internet (VoIP) call and publish a phone state. A list of example phone state availability values and corresponding optional activity tokens and custom strings is provided in Table 4 below.

TABLE 4

| Availability Value | Activity Token | Custom String | Description |
|---|---|---|---|
| 6500 | In a call | In a 1 on 1 conversation | User is speaking with one person |
| 6750 | In a conference | In a multiparty conversation | User is speaking with more than one person |

Similar to the user states listed in Table 2 and the machine states listed in Table 3, the phone states listed in Table 4 are ranked according to their indication of availability from more available to less available, where the larger availability value corresponds to the less available state. The activity token, when present, is a text string that represents the particular phone state. The custom string, when present, is a text string that further describes the particular phone state. For example, the custom string may describe the phone state in a specific language, such as Japanese. The activity token and the custom string are typically provided by the publisher (e.g., the client application that published the phone state). For example, the client application can determine that the publisher is currently conducting a one-on-one conversation. In this example, the client application can publish a phone state in the publisher's status container on the presence aggregation server as a phone state availability value of 6500 (e.g., phone state; avail=6500; activity token="In a call"; custom string="In a 1 on 1 conversation"). When a phone state is published, the presence aggregation server stamps the publication with a publication time.

A calendar state indicates the state of a publisher's calendar. For example, the client application can interact with a calendaring application to determine that the publisher is free, in a meeting, out of the office, etc., and publish this information as a calendar state. A list of example calendar state availability values and corresponding optional activity tokens and custom strings is provided in Table 5 below.

TABLE 5

| Availability Value | Activity Token | Custom String | Description |
|---|---|---|---|
| 3500 | NULL | Free | Publisher has no meeting |
| 3500 | NULL | Tentative | Publisher has a meeting they have not accepted |
| 6500 | In a meeting | In a meeting | Publisher has accepted a meeting |
| 3500 | Out of Office | Out of the Office | Publisher is not in the office |

Similar to the user states listed in Table 2, the machine states listed in Table 3, and the phone states listed in Table 4, the calendar states in Table 5 are ranked according to their indication of availability from more available to less available, where the larger availability value corresponds to the less available state. The activity token, when present, is a text string that represents the particular calendar state. The custom string, when present, is a text string that further describes the particular calendar state. For example, the custom string may provide additional details regarding the particular calendar state that is not provided by the activity token. The activity token and the custom string are typically provided by the publisher (e.g., the client application that published the calendar state). For example, the client application can determine that the publisher has no meetings. In this example, the client application can publish a calendar state in the publisher's status container on the presence aggregation server as a calendar state availability value of 3500 (e.g., calendar state; avail=3500; activity token="NULL"; custom string="Free"). When a calendar state is published, the presence aggregation server stamps the publication with a publication time.

A conference state indicates the state of a publisher's conferencing activities. For example, the client application may detect that the publisher is currently participating in a conference and publish a conference state. A list of example conference state availability values and corresponding optional activity tokens and custom strings is provided in Table 6 below.

TABLE 6

| Availability Value | Activity Token | Custom String | Description |
|---|---|---|---|
| 9500 | NULL | Presenting | Participant in full screen mode |

TABLE 6-continued

| Availability Value | Activity Token | Custom String | Description |
|---|---|---|---|
| 6900 | Urgent-Interruptions-Only | Urgent interruptions only | Publisher is presenting (Do-Not-Disturb) but certain subscribers should see a "Busy" availability |
| 6750 | In a multiparty conference | In a conference | Publisher is speaking with more than one person in the same conversation in a mode other than Instant Messaging |

Similar to the user states listed in Table 2, the machine states listed in Table 3, the phone states listed in Table 4, and the calendar states listed in Table 5, the conference states listed in Table 6 are ranked according to their indication of availability from more available to less available, where the larger availability value corresponds to the less available state. The activity token, when present, is a text string that represents the particular conference state. The custom string, when present, is a text string that further describes the particular conference state. For example, the custom string may describe the conference state in a specific language, such as Japanese, or provide additional details regarding the particular conference state that is not provided by the activity token. The activity token and the custom string are typically provided by the publisher (e.g., the client application that published the conference state). By way of example, the client application may detect that a conferencing application, such as MICROSOFT's POWERPOINT, executing on the publisher's machine is in "full screen" mode. From this, the client application may determine that the publisher is currently presenting in a conference. In this example, the client application can publish a conference state in the publisher's status container on the presence aggregation server as a conference state availability value of 9500 (e.g., conference state; avail=9500; activity token="NULL"; custom string="Presenting"). When a conference state is published, the presence aggregation server stamps the publication with a publication time.

Generic states include the events that are not published as either a user state, a device state, a phone state, a calendar state, or a conference state. For example, the client application executing on the user's machine may detect an event that is not a user state, a device state, a phone state, a calendar state, or a conference state. In this instance, the client application can publish the event as a generic state in the publisher's status container on the presence aggregation server. In addition to indicating that the publication is a generic state publication and providing an availability value, the client application may also provide an activity token and/or a custom string that represents and/or additionally describes the published generic state. When a generic state is published, the presence aggregation server stamps the publication with a publication time.

In some embodiments, the client application may provide an application program interface (API) which allows events detected by other applications to be published. For example, applications such as a calendaring application, a phone application (e.g., VoIP application), another conferencing application, etc., can detect events and request that the client application publish the detected events in the publisher's status container on the presence aggregation server.

In some embodiments, a third-party application or device may directly publish events in the publisher's status container on the presence aggregation server. For example, a private branch exchange (PBX) device may be knowledgeable of the presence aggregation server and may have the necessary privileges (e.g., credentials) to publish presence information for a publisher in the publisher's status container on the presence aggregation server. When the PBX device detects an event, such as the publisher being currently engaged in a telephone call, the PBX device can publish the detected event by determining an appropriate availability value that represents the event. The PBX device can then publish the availability value as a generic state in the publisher's status container on the presence aggregation server. The PBX device may also provide an activity token and/or a custom string that represents and/or additionally describes the published generic state.

In some embodiments, the presence aggregation server determines an aggregated availability of a publisher by considering the publisher's presence state publications across all of the publisher's endpoints, and publishes the determined aggregated availability. The presence aggregation server monitors the status containers for changes to the publishers' state. Upon detecting a change to a publisher's state (e.g., a presence state publication to the publisher's status container), the presence aggregation server generates an aggregated availability for the publisher as the least available state across all of the publisher's endpoints. The presence aggregation server identifies the most available machine state from the published machine states, and only uses the most available machine state to perform the aggregation. To determine the publisher's aggregated availability, the presence aggregation server checks the publisher's status container for a publication of a user state. In the case where there is a user state publication, the presence aggregation server extracts the publication time of the user state publication, and sorts the other presence state publications (the identified most available machine state publication, phone state publications, calendar state publications, conference state publications, and generic state publications) in the status container by publication time, and eliminates the presence state publications that are older than the user state publication. From the remaining presence state publications, the presence aggregation server extracts the availability value from the least available state, and assigns this availability value as the publisher's aggregated availability. In the case where a user state publication is not present in the status container, the presence aggregation server extracts the availability value from the least available state from amongst the most available machine state publication, phone state publications, calendar state publications, conference state publications, and generic state publications, and assigns this availability value as the publisher's aggregated availability. The presence aggregation server then publishes the generated aggregated availability (e.g., a value representing the aggregated availability, an indication of an icon representing the aggregated availability, a default string representing the aggregated availability, etc.) in the publisher's status container, which causes each of the publisher's endpoints to be notified of the publisher's aggregated availability. The aggregated availability can then be displayed at each endpoint. The presence aggregation server may also publish the generated aggregated availability in one or more of the publisher's other containers. This causes the publisher's aggregated availability to be sent to the subscribers who have subscribed to the containers, thus notifying the subscribers of the publisher's aggregated availability.

Table 7 below contains a mapping of availability values to corresponding aggregated availabilities, default strings, and descriptions.

TABLE 7

| Aggregated Availability | Default String | Availability Value Range | Description |
| --- | --- | --- | --- |
| Online | Online | 3000-3999 | Publisher is reachable |
| Busy | Busy | 6000-6999 | Publisher is reachable but is engaged in another task |
| Do Not Disturb | Do Not Disturb | 9000-9999 | Publisher is reachable but does not want to be interrupted |
| Temporarily Away | Temporarily Away | 12000-12999 | Publisher is temporarily probably not reachable |
| Away | Away | 15000-15999 | Publisher is probably not reachable |
| Offline | Offline | 18000-18999 | Publisher is not reachable |

As shown in Table 7, a range of availability values maps to each aggregated availability. For example, the availability values in the range 3000-3999 map to the aggregated availability "Online." Mapping a range of availability values to a single aggregated availability allows for a ranking of availability values within a class of availabilities. For example, the phone state "In a multiparty conversation" in Table 4 above and the calendar state "In a meeting" above in Table 5 above will both map to the same aggregated availability "Busy." Even though both of these states result in the same aggregated availability, the phone state "In a multiparty conversation" is ranked lower (i.e., less available) than the calendar state "In a meeting" because of its larger availability number (6750>6500). As such, if the publisher's aggregated availability is to be chosen from these two states, the phone state "In a multiparty conversation" will be selected as the publisher's aggregated availability.

In some embodiments, the presence aggregation server determines a current activity that a publisher is engaged in and publishes this information. The presence aggregation server may publish a current activity as part of the aggregated state. To determine the current activity for a publisher, the presence aggregation server identifies the most available machine state from the published machine states. The presence aggregation server then checks the publisher's status container for a publication of a user state. In the case where there is a user state publication, the presence aggregation server extracts the publication time of the user state publication, and sorts the other presence state publications (the identified most available machine state publication, phone state publications, calendar state publications, conference state publications, and generic state publications) in the status container by publication time, and eliminates the state publications that are older than the user state publication. From the remaining presence state publications, the presence aggregation server removes the presence state publications that do not have a corresponding activity token or custom string (i.e., the state publications that do not include an activity). If there are no remaining presence state publications, the presence aggregation server publishes an indication that there is no current activity. If there are remaining presence state publications, the presence aggregation server selects the activity from the least available of the remaining presence state publications as the current activity. The presence aggregation server then publishes the current activity of the publisher in the publisher's status container. The presence aggregation server may also publish the current activity in one or more of the publisher's other containers. In this instance where the presence aggregation server publishes an indication that there is no current activity, the endpoint (e.g., an application executing on the endpoint) may select the default string that represents the publisher's aggregated availability as the publisher's current activity.

In some embodiments, a presence state publication may include multiple activities. Each activity included in the publication may have a corresponding indicator that specifies a condition under which the particular activity is to be considered valid. For example, a publication may indicate that the publisher's activity is to be "Out of the Office" if the availability value is greater than 15000, and that the activity is to be "Online" otherwise. As another example, a publication may indicate that the publisher's activity is to be "Out of the Office" between 10 a.m. and 2 p.m., and that the activity is to be "Free" at the other times during the day. One skilled in the art will appreciate that the condition indication for an activity may be specified in other ways. For example, a condition indicator may include a combination of availability value ranges and a range of times.

In some embodiments, the presence aggregation server determines an aggregated machine state for a publisher and publishes this information. The presence aggregation server identifies the publisher's most active machine state as the publisher's aggregated machine state, and publishes this information in the publisher's status container. The presence aggregation server may also identify as the most active machine the machine from which the most active machine state was published, and publish an indication of the most active machine in the publisher's status container. Each of the publisher's endpoints can use this information in multiple points of presence scenarios, for example, to automatically respond to a request that have been received by all of the publisher's endpoints.

FIG. 1 is a block diagram that illustrates components of a presence aggregation system, according to some embodiments. A presence aggregation system 102 is coupled to entity devices 104 via a network 106. The entity devices correspond to entities that may be publishers or subscribers. The presence aggregation system includes a receive update module 108, an update publication module 110, an add publication module 112, a receive subscription request module 114, an add subscription module 116, a create container module 118, a container store 120, an aggregation module 122, and an expire publications module 124. Some or all of the modules may be provided on a presence aggregation server or multiple presence aggregation servers. The container store contains the containers of the publishers (created by the create container module) and other data structures used by the presence aggregation system. The receive update module is invoked when a request to update a publication is received from a publisher. The receive update module invokes the update publication module to update the publication and the add publication module to add a new publication to a container. The receive subscription request module is invoked when a request is received from an entity to subscribe to a container of a publisher. The receive subscription request module invokes the add subscription module to subscribe the entity to the specified container or containers. The aggregation module processes the presence state publications in a publisher's status container to generate an aggregated state of the publisher. The expire publications module is periodically invoked by the presence aggregation system to clean up the expired (stale) publications in the containers in the container store. Although not shown in FIG. 1, the entity devices include components of the presence aggregation system to define containers and their ACLs, to send publication updates, to send subscription requests, to receive notifications of updates to publications, and to receive publications from the presence aggregation system.

The network is typically a communications link that facilitates the transfer of electronic content between the attached devices. In some embodiments, the network includes the Internet. It will be appreciated that the network may be comprised of one or more other types of networks, such as a local area network, a wide area network, a point-to-point dial-up connection, a wireless network, and the like.

The computing devices on which the presence aggregation system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the presence aggregation system. In addition, the data structures and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the presence aggregation system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The user devices may be cell phones, personal digital assistants, smart phones, personal computers, programmable consumer electronics, digital cameras, and so on.

The presence aggregation system may be described in the general context of computer-executable instructions, such as program modules and components, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
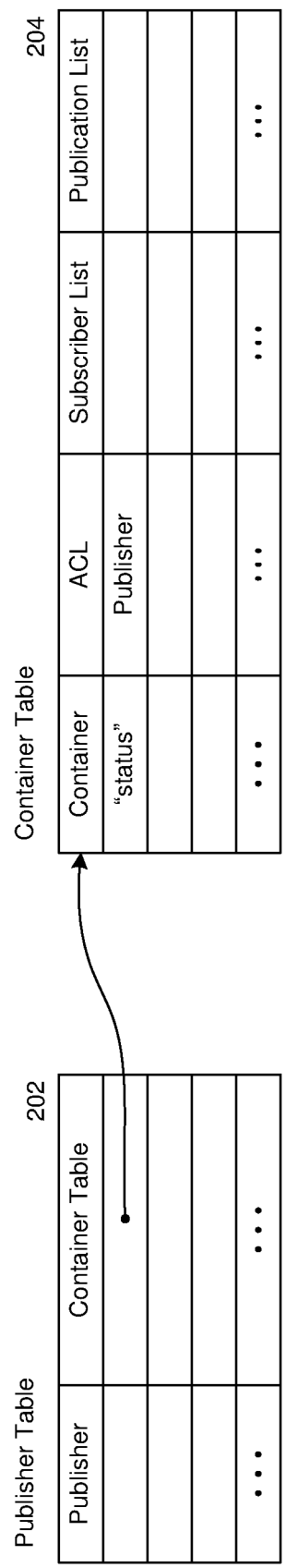
FIG. 2 is a data structure diagram that illustrates example logical data structures of the presence aggregation system, according to some embodiments.

FIG. 2 is a data structure diagram that illustrates example logical data structures of the presence aggregation system, according to some embodiments. The data structure includes a publisher table 202 that includes an entry for each publisher. Each entry identifies a publisher and points to the publisher's container table 204. The publisher's container table contains an entry for each container of the corresponding publisher. Each entry identifies the container (e.g., by name) and contains an ACL, a subscriber list, and a publication list. The ACL specifies the entities who are allowed to subscribe to the corresponding container. The subscriber list identifies the subscribers who are subscribed to the corresponding container. The publication list contains an entry for each publication of the container. When a publication is made in a container, the presence aggregation system uses the subscriber list to identify the subscribers that are to be notified. When an entity subscribes to a container, the presence aggregation system uses the ACL to determine whether to grant or deny the subscription. One skilled in the art will appreciate that this is only one example of the logical layout of data structures of the presence aggregation system.

The data structures of the presence aggregation system may be tailored to the space/computation requirements of the presence aggregation system. For example, the subscriber list may be provided in a separate table, such as a subscriber table. Each entry in the subscriber table may specify a publisher, a subscriber, and a list of publications (including their versions). The presence can use the combination of tables to determine what versions of the publications should be seen by the subscribers.

Figure 3:
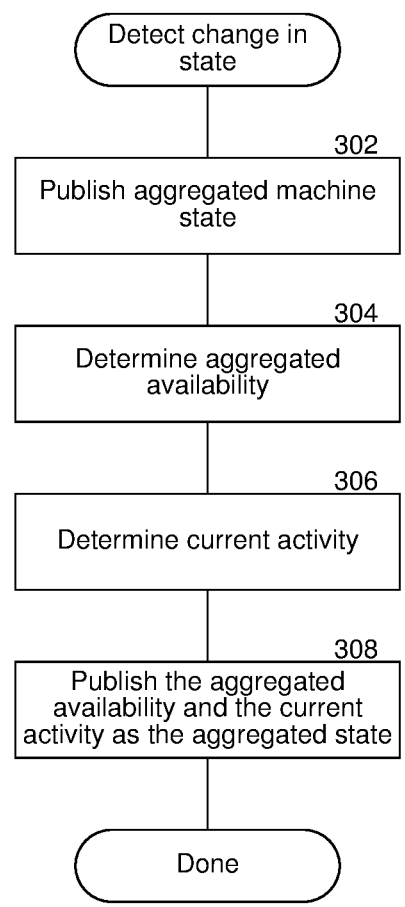
FIG. 3 is a flow diagram that illustrates the processing of the presence aggregation system, according to some embodiments.

FIG. 3 is a flow diagram that illustrates the processing of the presence aggregation system, according to some embodiments. The presence aggregation system monitors the status containers for changes to the states of publishers. When a change in a state of a publisher is detected, the system, in block 302, determines an aggregated machine state of the publisher and publishes the aggregated machine state in the publisher's status container. In block 304, the system determines an aggregated availability of the publisher. In block 306, the system determines the current activity of the publisher. In block 308, the system publishes the aggregated availability and the current activity as the aggregated state of the publisher in the publisher's status container and the publisher's other containers which have been designated as being appropriate for the publication of the aggregated state. The publisher can designate the containers that are appropriate for the publication of the aggregated state.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 4:
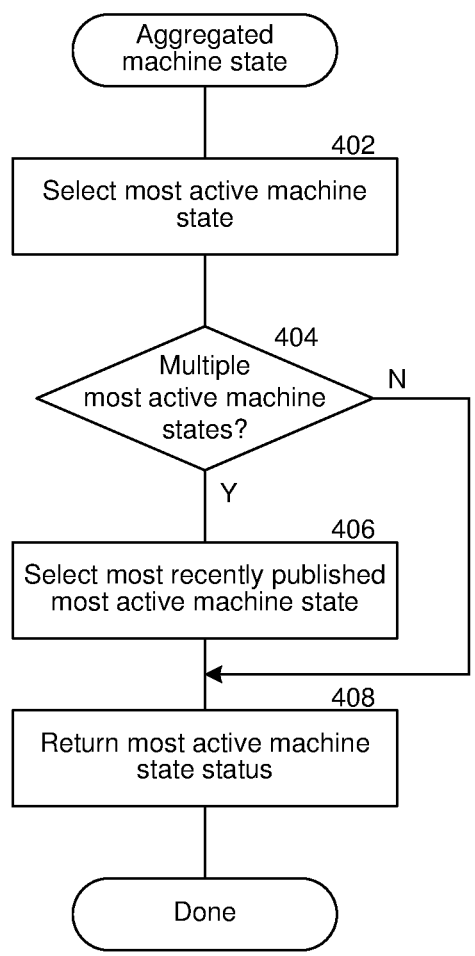
FIG. 4 is a flow diagram that illustrates the processing of the aggregation module in determining an aggregated machine state, according to some embodiments.

FIG. 4 is a flow diagram that illustrates the processing of the aggregation module in determining an aggregated machine state, according to some embodiments. The aggregation module processes the machine state publications in a publisher's status container and notifies the publisher's endpoints of the single aggregated machine state for the publisher's most active machine. In block 402, the aggregation module selects the most active machine state (i.e., the machine state publication having the lowest availability value). In block 404, the aggregation module checks to determine whether there are multiple most active machine states. If there is more than one most active machine state, then, in block 404, the aggregation module selects as the most recently published most active state. In block 408, the aggregation module returns the most active machine state. In some embodiments, the aggregation module identifies the machine that published the most active machine state, and returns an indication of this machine (i.e., the most active machine). If two machines (e.g., respective endpoints on the two machines) published the same machine state that was determined to be the most active machine state, the aggregation module identifies as the most active machine the machine that most recently published the most active machine state. For example, if a Machine A published an Active machine state at 1:00 PM and a Machine B published an Active machine state at 1:30 PM, the aggregation module identifies Machine B as the most active.

Figure 5:
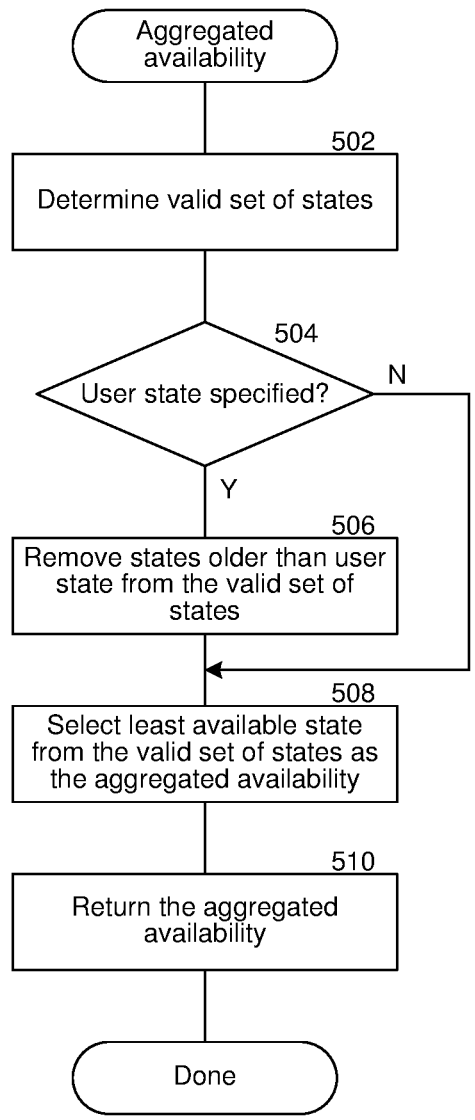
FIG. 5 is a flow diagram that illustrates the processing of the aggregation module in determining an aggregated availability, according to some embodiments.

FIG. 5 is a flow diagram that illustrates the processing of the aggregation module in determining an aggregated availability, according to some embodiments. In block 502, the aggregation module determines a valid set of states from which to generate an aggregated availability. The valid set of states may include the most active machine state and any user state, phone states, calendar states, conference states, and generic state publications in the subscriber's status container. In block 504, the aggregation module checks to determine if a user state is published. If the aggregation module determines that a user state publication is present in the status container, then, in block 506, the aggregation module removes the states that are older than the user state from the valid set of states. For example, the aggregation module identifies the states in the valid set of states that have publication times that are older than the publication time of the user state, and removes these older states from the valid set of states. If, in block 504, the aggregation module determines that a user state is not published, or subsequent to removing from the valid set of states the states that are older than the published user state in block 506, the aggregation module, in block 508, selects as the aggregated availability the least available state (e.g., the state having the highest availability value) from the valid set of states. In block 510, the aggregation module returns the aggregated availability.

Figure 6:
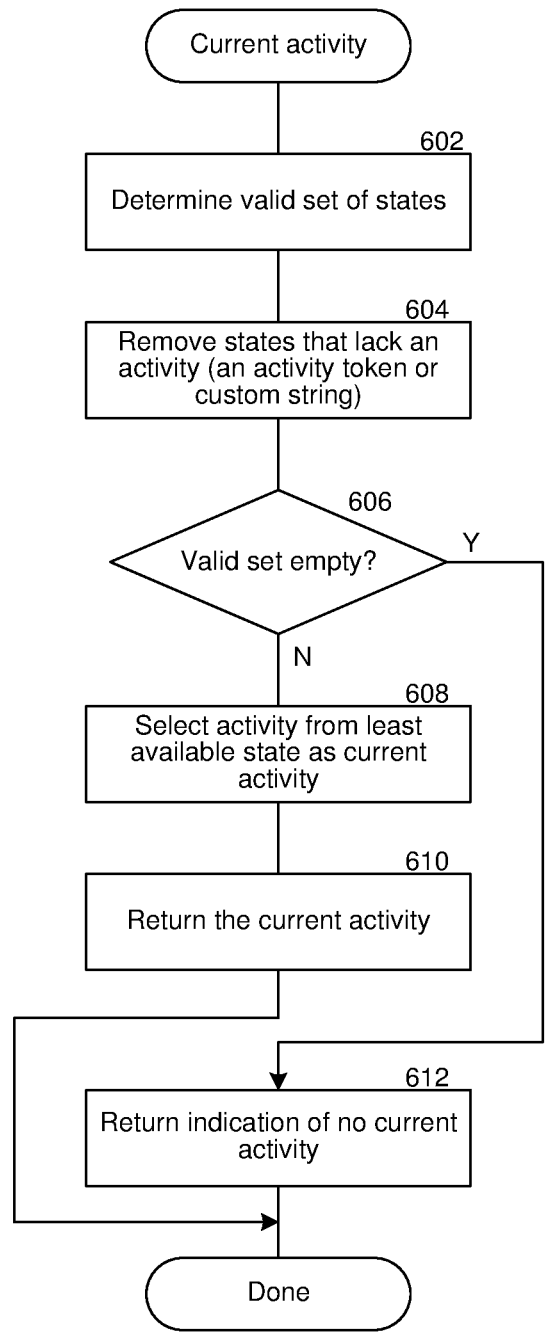
FIG. 6 is a flow diagram that illustrates the processing of the aggregation module in determining a current activity, according to some embodiments.

FIG. 6 is a flow diagram that illustrates the processing of the aggregation module in determining a current activity, according to some embodiments. In block 602, the aggregation module determines a valid set of states from which to determine the current activity of a publisher. The valid set of states may include the most active machine state and any user state, phone states, calendar states, conference states, and generic state publications in the subscriber's status container. In block 604, the aggregation module removes from the valid set of states the states that do not have a corresponding activity token. For example, some publications may not specify an activity token. In block 606, the aggregation module checks to determine whether the valid set of states is empty. If the valid set of states is not empty, then, in block 608, the aggregation module selects the activity from the least available state as the current activity. In block 610, the aggregation module returns the current activity. Otherwise, if the aggregation module determines that the valid set of states is empty (block 606), then, in block 612, the aggregation module returns an indication of no current activity.

From the foregoing, it will be appreciated that specific embodiments of the presence aggregation system have been described herein for purposes of illustration, but that various modifications may be made without deviating from the spirit and scope of the invention. For example, one skilled in the art will appreciate that a publisher may publish presence information directly to one or more of the publisher's containers. In response to such a publication, the presence aggregation system can notify the subscribers who have subscribed to these containers the presence information published by the publisher. As another example, one skilled in the art will appreciate that a publication may have a corresponding expire type that indicates the condition or conditions under which to expire the publication. For example, the expire type may indicate that a publication is to be expired after a duration of time, after the publisher logs off from all of the publisher's endpoints, when the publisher is no longer using any of the publisher's machines, etc. Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method performed by a computing device for aggregating presence information of a publisher, the method comprising:
   identifying a user state publication of the publisher that was most recently published, the user state publication representing availability of the publisher as specified by the publisher and having an availability value;
   identifying other state publications of the publisher published after the identified user state publication, the other state publications representing availability of the publisher as derived from monitoring the publisher and having an availability value;
   identifying from the availability values of the identified user state publication and the identified other state publications a least available state; and
   generating an aggregated state of the publisher indicating overall availability of the publisher based on the identified least available state so that the aggregated state is derived from the identified user state publication and the identified other state publications.

2. The method of claim 1 wherein at least one of the other state publications is a machine state publication.

3. The method of claim 1 wherein at least one of the other state publications is published by a third party on the publisher's behalf.

4. The method of claim 1 wherein at least one of the other state publications is published by an endpoint of the publisher.

5. The method of claim 1 further comprising publishing the aggregated state to subscribers to the presence information of the publisher.

6. The method of claim 5 wherein endpoints of the publisher are subscribers to the presence information of the publisher.

7. The method of claim 5 wherein a state publication indicates an activity and further comprising upon detecting a change in the publisher's state; publishing a current activity of the publisher.

8. The method of claim 1 wherein the computing device is an endpoint of the publisher.

9. A computing device for aggregating presence information of a publisher, the computing device comprising:
   a computer-readable medium storing computer-executable instructions adapted to control a processor to
   access a collection of presence state publications for the publisher, each presence state publication having an availability value and an activity, the presence state publications including user state publications and other state publications, the user state publications representing availability of the publisher as manually specified by the publisher and the other state publications representing availability of the publisher as derived from monitoring the publisher, each presence state publication having a publication time;
   identify from the collection a user state publication with the latest publication time;
   identify from the collection other state publications with a publication time that is later the publication time of the identified user state publication; and
   generate an aggregated state of the publisher indicating overall availability of the publisher based on a least available state derived from the identified user state publication and the identified other state publications; and
   a processor for executing the computer-executable instructions stored in the computer-readable medium.

10. The computing device of claim 9 wherein at least one of the other state publications is published by a computer of a third party on the publisher's behalf.

11. The computing device of claim 9 wherein at least one of the other state publications is published by an endpoint of the publisher.

12. The computing device of claim 9 wherein the computer-executable instructions are further adapted to control a processor to publish the aggregated state to subscribers to the presence information of the publisher.

13. The computing device of claim 12 wherein endpoints of the publisher are subscribers to the presence information of the publisher.

14. The computing device of claim 12 wherein a state publication indicates an activity and wherein the computer-executable instructions further adapted to control a processor to upon detecting a change in the publisher's state, publish a current activity of the publisher.

15. The computing device of claim 12 wherein the computing device is an endpoint of the publisher.

16. The computing device of claim 12 wherein the computing device is a presence server.

17. A presence system for aggregating presence information of a publisher, the presence system comprising:
- a computer-readable medium storing a collection of presence state publications for the publisher, each presence state publication having a state indicated by an availability value and an activity, the presence state publications including a user state publication and other state publications, the user state publication representing availability of the publisher as specified by the publisher and the other state publications representing availability of the publisher as derived from monitoring the publisher;
- a computer-readable medium storing computer-executable instructions adapted to control a processor to
  identify from the collection a user state publication of the publisher that was most recently published;
  identify other state publications of the publisher published after the identified user state publication;
  identify from the availability values of the identified user state publication and the identified other state publications a least available state;
  generate an aggregated state of the publisher indicating overall availability of the publisher based on the identified least available state so that the aggregated state is derived from the identified user state publication and the identified other state publications; and
  publish the aggregated state to subscribers to presence information of the publisher; and
- a processor for executing the computer-executable instructions stored in the computer-readable medium.

18. The presence system of claim 17 wherein endpoints of the publisher are subscribers to the presence information of the publisher.

19. The presence system of claim 17 wherein the subscribers include endpoints of the publisher.

20. The presence system of claim 17 wherein a state publication indicates an activity and wherein the computer-executable instructions are further adapted to control a processor to upon detecting a change in the publisher's state, publish a current activity of the publisher.

* * * * *